United States Patent
Ling et al.

(10) Patent No.: US 10,333,169 B2
(45) Date of Patent: Jun. 25, 2019

(54) MAGNESIUM BATTERY HAVING AN ELECTROLYTE CONTAINING CATIONS OF MAGNESIUM AND SODIUM

(71) Applicant: Toyota Motor Engineering & Manufacturing North America, Inc., Erlanger, KY (US)

(72) Inventors: Chen Ling, Ann Arbor, MI (US); Ruigang Zhang, Ann Arbor, MI (US); Rana Mohtadi, Northville, MI (US); Oscar Tutusaus, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 403 days.

(21) Appl. No.: 15/081,319

(22) Filed: Mar. 25, 2016

(65) Prior Publication Data
US 2017/0279151 A1   Sep. 28, 2017

(51) Int. Cl.
| | |
|---|---|
| H01M 10/0568 | (2010.01) |
| H01M 10/0567 | (2010.01) |
| H01M 10/0566 | (2010.01) |
| H01M 10/0563 | (2010.01) |
| H01M 10/0561 | (2010.01) |
| H01M 10/056 | (2010.01) |
| H01M 10/05 | (2010.01) |
| H01M 10/054 | (2010.01) |
| H01M 10/0585 | (2010.01) |
| H01M 4/134 | (2010.01) |
| H01M 4/131 | (2010.01) |
| H01M 4/133 | (2010.01) |
| B60L 11/18 | (2006.01) |
| H01M 4/02 | (2006.01) |

(52) U.S. Cl.
CPC ....... *H01M 10/054* (2013.01); *B60L 11/1851* (2013.01); *H01M 4/131* (2013.01); *H01M 4/133* (2013.01); *H01M 4/134* (2013.01); *H01M 10/056* (2013.01); *H01M 10/0585* (2013.01); *H01M 2004/027* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0349177 A1* | 11/2014 | Chung | ............. | H01M 10/0568 429/200 |
| 2015/0111097 A1* | 4/2015 | Park | .................... | H01M 4/485 429/188 |
| 2015/0180024 A1* | 6/2015 | Nose | ...................... | C01B 25/45 429/220 |
| 2015/0207174 A1* | 7/2015 | Lee | .................. | H01M 10/0567 429/332 |

FOREIGN PATENT DOCUMENTS

JP   WO 2013/187160   * 12/2013   ............. H01M 4/58

* cited by examiner

*Primary Examiner* — Yoshitoshi Takeuchi
(74) *Attorney, Agent, or Firm* — Oblon, McClelland, Maier & Neustadt, L.L.P.

(57) ABSTRACT

A magnesium-ion battery containing an anode of magnesium metal, a cathode, capable of absorption and release of Na ions; and a nonaqueous electrolyte containing a sodium ion salt selected from NaHMDS, $NaPF_6$ and a sodium carborane and a magnesium ion salt selected from $PhMgCl$—$AlCl_3$ (APC), a Mg carborane, and MgHMDS—Cl is provided.

10 Claims, 12 Drawing Sheets

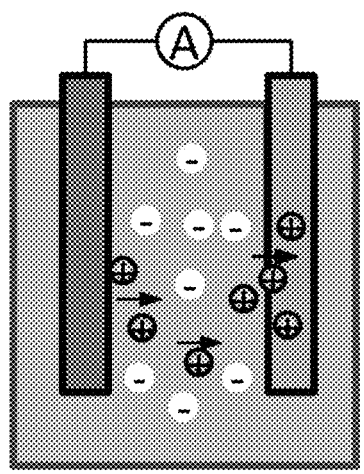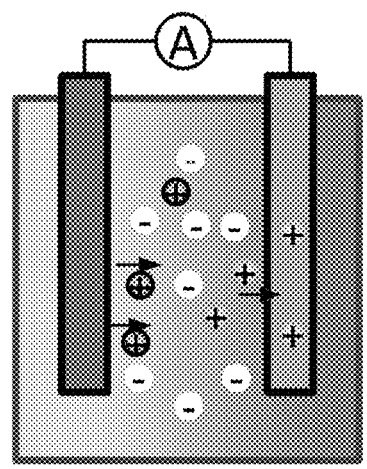
Fig. 1A
PRIOR ART
Fig. 1B

Fig. 3A
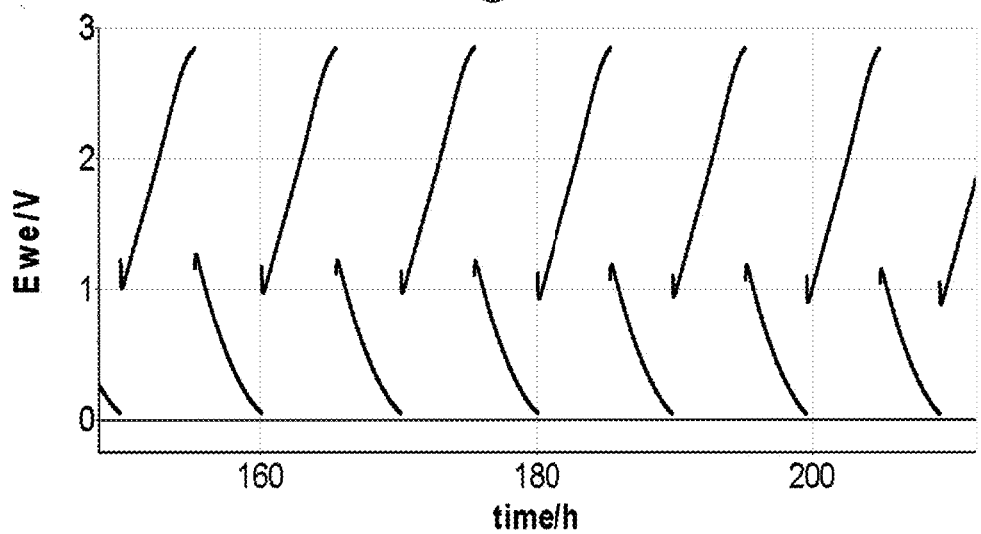
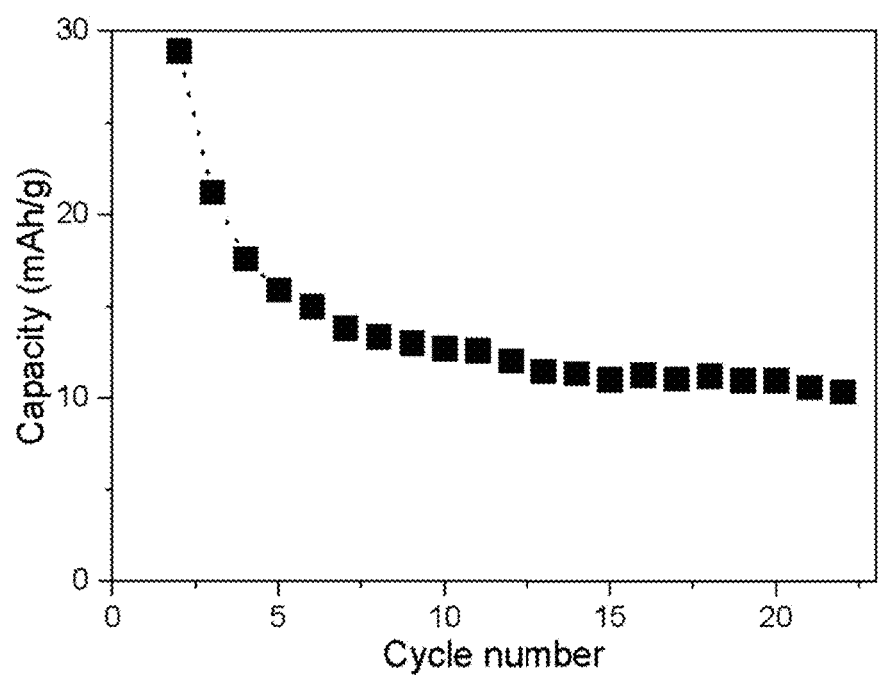
Fig. 3B

US 10,333,169 B2

MAGNESIUM BATTERY HAVING AN ELECTROLYTE CONTAINING CATIONS OF MAGNESIUM AND SODIUM

BACKGROUND

Field of the Technology

This disclosure is directed to a magnesium ion reversible battery containing a dual ion electrolyte composed of a magnesium salt and a sodium salt. This battery can combine the advantages of a magnesium metal anode and the performance of a sodium ion cathode. Such dual ion anode-cathode and electrolyte systems may be useful to produce a magnesium battery of sufficient capacity and cycle lifetime to be useful as a power source for utilities requiring a high capacity and high cycle lifetime.

Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Moreover, lithium ion batteries based on lithium metal anodes are subject to safety concerns due to dendrite formation during repeated cycles of charge and discharge. Such dendrites can lead to short circuiting and possible uncontrolled thermal reactions and to provide cells of greater safety lithium ion batteries based on safer anode materials such as graphite are employed.

Sodium ion batteries suffer many of the same problems associated with lithium batteries, especially with regard to flammability and dendrite formation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

In contrast to lithium and sodium, magnesium does not form dendritic structures during charge/discharge cycling and therefore is considered a much safer and attractive metal for future metal ion batteries. However, development of magnesium ion batteries has to date been inhibited because fully functional and compatible anode/electrolyte/cathode systems have not been found. Due to the double positive charge and small ionic radius, magnesium ions do not readily diffuse into and out of conventional cathode materials as takes place with singly charged lithium and sodium ions. Additionally, electrolytes that have been used with magnesium metal anodes suffer oxidation at the cathode. Thus, for magnesium (Mg) batteries to be successful as a post lithium-ion systems, compatible electrolyte systems and cathode active materials must be identified and developed. They are expected to be high energy battery systems, due to the high volumetric capacity made available via the two electron transfer per Mg. However, a cathode active material compatible with magnesium and providing high capacity and durability is a subject of much ongoing investigation.

Examples of cathode active materials for magnesium electrochemical cells which are conventionally known include sulfur, $MnO_2$ and a Chevrel compound having a formula $Mg_xMo_6T_n$, wherein x is a number from 0 to 4, T is sulfur, selenium or tellurium, and n is 8. Likewise, a K ion stabilized α-$MnO_2$ has been indicated as showing very high reversible capacity (US 2013/0004830 A1). Although improvement in magnesium ion cathode capacity has been accomplished with these cathode systems, cathode-electrolyte combinations which fully utilize the potential of a magnesium anode remain the goal of ongoing research and development.

In an alternative approach to the problem, a Mg—Na dual-ion battery has been proposed as a post-Li ion system. Such a system is of interest because it can combine the advantage of Mg metal anode with the efficient and facile insertion, diffusion and de-insertion of the sodium ion to and from a Na ion battery cathode.

FIG. 1(A) illustrates the conventional configuration of a Li-ion battery, and in many post Li-ion batteries such as Li-sulfur, Li-air, Na-ion, Mg-ion, and Al-ion battery. The conventional battery is composed of a positive electrode (cathode), a negative electrode (anode), electrolyte and other necessary accessories such as current collectors. During discharge, positive Li+ ions are extracted from the negative electrode to the electrolyte. On the other side, positive Li+ ions are inserted into the positive electrode from the electrolyte. Hence the whole process inside the cell is the transport of positive Li+ ions between negative and positive electrode through the electrolyte. Likewise for single ion Mg-ion, Na-ion and Al-ion batteries, the process inside the cell is the transport of positive $Mg^{2+}$, $Na^+$, $Al^{3+}$, respectively.

FIG. 1(B) illustrates the concept of a battery which utilizes the transport of magnesium and sodium positive ions between negative magnesium electrode and a positive sodium ion electrode. It contains metal Mg as the negative electrode and a positive electrode that is capable of insertion and extraction of sodium ions. The electrolyte used in this battery must support transport of both $Mg^{2+}$ and $Na^+$ ions. In the discharge of the cell, on the negative magnesium electrode side, Mg dissolves from magnesium electrode and enters the electrolyte as positive $Mg^{2+}$ ions. On the positive electrode side $Na^+$ ions are inserted into the positive electrode. Such systems have been shown in concept. However, functional working systems have not yet been identified.

Therefore, an object of the present embodiments is to provide a rechargeable magnesium battery containing magnesium metal as an active anode material combined with a sodium ion cathode and a dual ion magnesium sodium electrolyte which is suitable for utility as a battery having high capacity and high cycle lifetime.

Further objects of the embodiments include the identification and development of compatible and functional magnesium sodium dual ion electrolytes for a battery having a magnesium metal anode and a sodium ion cathode.

SUMMARY

These and other objects have been achieved according to the following embodiments, the first embodiment of which includes a magnesium-ion battery, comprising:

an anode comprising magnesium metal; a cathode, capable of absorption and release of Na ions; and a nonaqueous electrolyte comprising: a sodium ion salt selected from the group consisting of sodium hexamethyl disalazide (NaHMDS), NaPF$_6$ and a sodium carborane; a magnesium ion salt selected from the group consisting of PhMgCl—AlCl$_3$ (APC), a Mg carborane, and MgHMDS—Cl; and a nonaqueous solvent.

In an aspect of the embodiment the nonaqueous solvent comprises at least one solvent selected from tetrahydrofuran (THF) and tetraglyme.

In one specific aspect of the first embodiment the sodium ion salt is a sodium carborane of formula Na(CB$_{11}$H$_{12}$).

In a further specific aspect of the first embodiment a magnesium battery is provided, wherein the magnesium ion salt is PhMgCl—AlCl$_3$ (APC), the sodium ion salt is a sodium carborane of formula Na(CB$_{11}$H$_{12}$), and a content of the sodium carborane of formula Na(CB$_{11}$H$_{12}$), is from 50 to 90 mol %.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1(A) shows a schematic diagram of a convention single ion electrochemical cell.

FIG. 1(B) shows a schematic diagram of a Mg$^{2+}$—Na$^+$ dual ion electrochemical cell.

FIG. 3(A) shows the cyclic voltage profile of a Mg—Na dual ion battery according to the embodiment of the present invention prepared in Example 1.

FIG. 3(B) shows the discharge capacity as a function of cycle number of a Mg—Na dual ion battery according to the embodiment of the present invention prepared in Example 1.

DETAILED DESCRIPTION OF THE INVENTION

In a first embodiment, a magnesium sodium dual ion magnesium-ion battery is provided. The battery comprises: an anode comprising magnesium metal; a cathode, capable of absorption and release of Na ions; and a nonaqueous electrolyte comprising: a sodium ion salt selected from the group consisting of sodium hexamethyl disalazide (NaHMDS), NaPF$_6$ and a sodium carborane; a magnesium ion salt selected from the group consisting of PhMgCl—AlCl$_3$ (APC), a Mg carborane, and magnesium hexamethyl disalazide chloride (MgHMDS—Cl); and a nonaqueous solvent.

The nonaqueous solvent may be ethereal solvents including tetrahydrofuran (THF), ethylene glycol dimethyl ether (glyme), bis(2-methoxyethyl) ether (diglyme), tetraethylene glycol dimethyl ether (tetraglyme), or any other ethereal solvent capable of solubilizing the described magnesium and sodium salts.

In an aspect of the embodiment the nonaqueous solvent comprises at least one solvent selected from tetrahydrofuran (THF) and tetraglyme.

Magnesium electrolyte salts employed may include HMDSMgCl—AlCl$_3$ in THF and PhMgCl—AlCl$_3$ in THF. Examples of such electrolyte systems which may be suitable are described in U.S. Pat. Nos. 8,354,193 and 8,318,354 the disclosures of which are included by reference herein. Mg carboranes are described in U.S. application Ser. No. 14/272,318, filed May 7, 2014, the disclosure of which is incorporated herein by reference. The magnesium carboranes may include compounds such as MgC$_2$B$_{10}$H$_{11}$X and MgCB$_{11}$H$_{12}$X, where X is a halide such as Cl$^-$ and Br$^-$, and halide free compounds such as Mg(C$_2$B$_{10}$H$_{11}$)$_2$, Mg(CB$_{11}$H$_{12}$)$_2$ and Mg(CB$_{11}$H$_{12}$)(BH$_4$). Additional examples may include compounds such as Mg$_2$(C$_2$B$_{10}$H$_{10}$)X$_2$, where X is a halogen anion such as Cl$^-$.

Figure 5:
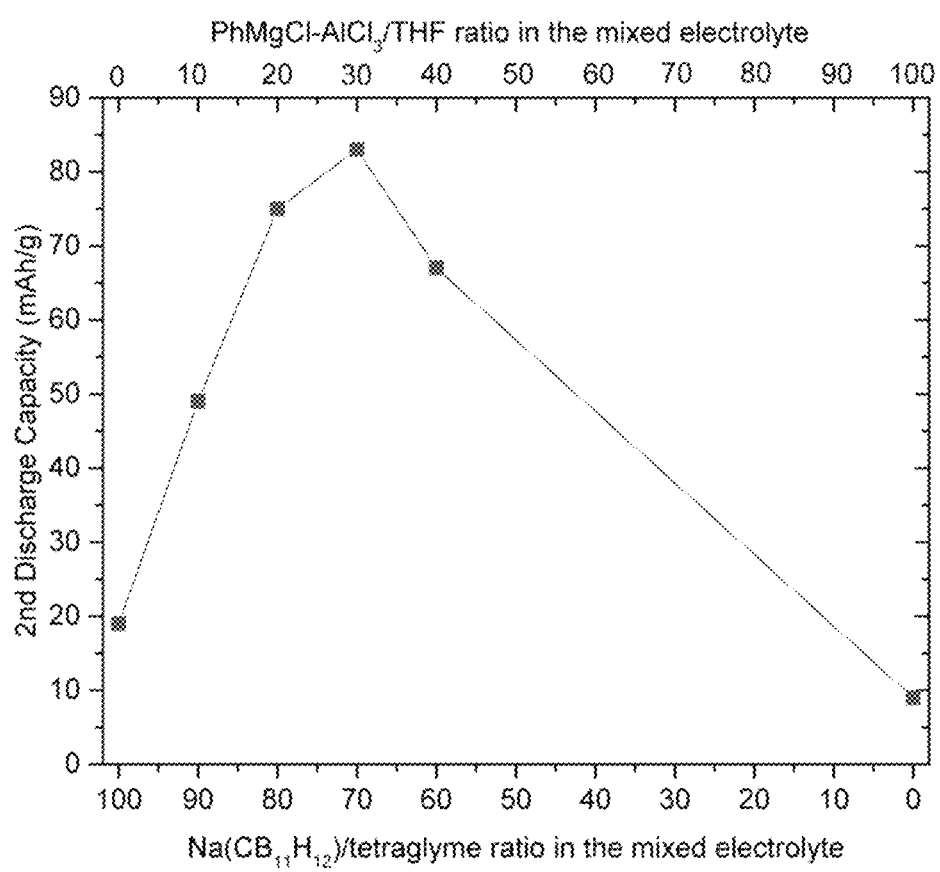
FIG. 5 shows the 2$^{nd}$ discharge capacity of a Mg—Na dual ion battery using different mol % ratios of Na(CB$_{11}$H$_{12}$) and APC electrolyte as described in Example 4.

The Mg—Na dual-ion electrolytes may be prepared by mixing an Mg ion organic solution and Na ion organic solution at a specified ratio. The actual ratio may be determined as described below and in Example 4 as shown in FIG. 5.

In one specific aspect of the first embodiment the sodium ion salt is a sodium carborane of formula Na(CB$_{11}$H$_{12}$) (NaCB).

The improvement in capacity was demonstrated in comparative Example 2 and Example 3 wherein the use of a dual ion electrolyte of Na(CB$_{11}$H$_{12}$)/tetraglyme and M PhMgCl—AlCl$_3$/THF yielded a battery of much greater capacity than a battery having a single ion electrolyte of Na(CB$_{11}$H$_{12}$)/tetraglyme.

As described in Example 4 a battery was constructed with a magnesium metal negative electrode and a positive electrode of NaCrO$_2$. An electrolyte of 0.5 M Na(CB$_{11}$H$_{12}$)/tetraglyme and 0.4 M PhMgCl—AlCl$_3$/THF was used wherein a study was conducted to determine the effect of the relative amounts of the two electrolytes. The 2$^{nd}$ discharge capacity of Mg—Na dual ion battery using different relative amounts of NaCB and APC electrolyte was determined as shown in FIG. 5.

The capacity of NaCrO$_2$ increased with increasing content of APC relative to NaCB in the electrolyte and then reached a maximum of 85 mAh/g at a APC/NaCB ratio of 3/7 (v/v). The cell capacity dropped with increase APC content beyond the 3/7 ratio. Since the disclosed battery is a dual-ion system, both Mg$^{2+}$ and Na$^+$ are needed to achieve high electrochemical performance. Thus, the hybrid cell showed poor performance with only one of APC or NaCB present as electrolyte. The APC/NaCB hybrid electrolyte is considered a complex system and without wishing to be bound by theory the inventors interpret the hybrid electrolyte composition and electrochemical performance in the following manner.

The composition of the APC electrolyte (PhMgCl:AlCl$_3$=2:1) has been described according to the following equation (All species are coordinated with THF) (Aurbach; *J. Am. Chem. Soc.* 2011, 133, 6270):

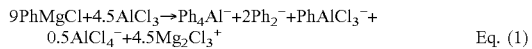
9PhMgCl+4.5AlCl$_3$→Ph$_4$Al$^-$+2Ph$_2^-$+PhAlCl$_3^-$+
0.5AlCl$_4^-$+4.5Mg$_2$Cl$_3^+$   Eq. (1)

Of the ion species indicated, the Mg$_2$Cl$_3^+$ dimer is the major active specie for Mg deposition in APC electrolyte.

In the hybrid electrolyte of this disclosure APC and NaCB are combined. Unlike APC, the NaCB electrolyte composition is relatively simple having only Na$^+$ cations and CB$^-$ anions in the solution. The inventors have found that the addition of APC to NaCB results in the formation of NaCl which precipitates from the nonaqueous solvent. Although all the species in Eq. 1 contain Cl, due to the various bonding properties in the species, these species differ in their capability to release Cl$^-$ ion. Mg$_2$Cl$_3^+$ is most likely to release because the Mg—Cl association is mainly an ionic bond. The reaction between Mg$_2$Cl$_3^+$ and Na$^+$ may be described in the following equation (Eq. 2):

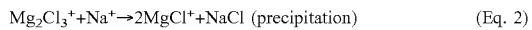
Mg$_2$Cl$_3^+$+Na$^+$→2MgCl$^+$+NaCl (precipitation)   (Eq. 2)

MgCl$^+$ is also believed to be an active specie for Mg deposition (Phys. Chem. Chem. Phys., 2014, 16, 25789). So the concentration of active species in the hybrid electrolyte is doubled based on Eq. 2. Thus, the addition of a small amount of APC to NaCB results in an increase of Mg active species from Mg$_2$Cl$_3^+$ to MgCl$^+$ and enhances Mg deposition and consequently facilitates the overall electrochemical performance of the hybrid electrolyte battery. It should be noted that the equilibrium of those species shown in Eq. 1 is related to a variety of factors, such as the total concentration, solvent, components ratio (Ph:Mg:Al:Cl), and even the preparation procedure. Moreover, there are actually numerous minor species such as Ph$_3$AlCl$^-$ in the APC electrolyte. If APC has low concentration in the hybrid electrolyte, all the species in Eq. 1 are isolated by NaCB electrolyte. The concentration change of Mg$_2$Cl$_3^+$ may not significantly affect other species. However, if too much APC is added to NaCB, all the species in Eq. 1, including the minor species, will interact to change the concentration of Mg$_2$Cl$_3^+$ and shift the original equilibrium. In this case, the performance of Mg electrolyte will change. In addition, the formation of NaCl also decreases the concentration of Na$^+$ in the hybrid electrolyte. If too much APC is added (over 30% as shown in the FIG. 5), NaCl precipitation would reduce the available Na$^+$ ions concentration thus decreasing Na ion conductivity in the hybrid electrolyte. In summary, at the lower contents of APC relative to NaCB improvement of the electrochemical performance due to the formation of more active species for Mg deposition may result. On the other hand, once the content of APC exceeds the optimum amount, the hybrid electrolyte performance may deteriorate due to the loss of original equilibrium in Eq. 1 and loss of too much Na$^+$ as NaCl precipitate. Hence, there must be an optimum performance of the hybrid electrolyte, which was described by the highest capacity of the hybrid capacity. As shown in FIG. 5, the optimized ratio is NaCB to APC at 7/3, v/v in that embodiment. The element of having a mol % of Na ions of 60% or greater is believed to be important to the performance of all dual ion combinations according to the first embodiment. However, it may be necessary to optimize the actual ratio of the hybrid combination to correspond with solvent, cathode and separator structure.

Even with the improvement obtained with the hybrid electrolyte, the inventors recognized that there was still a gap between the practical capacity obtained with the hybrid cell and theoretical capacity (125 mAh/g). In addition, the rate performance was also not considered satisfactory.

Figure 6:
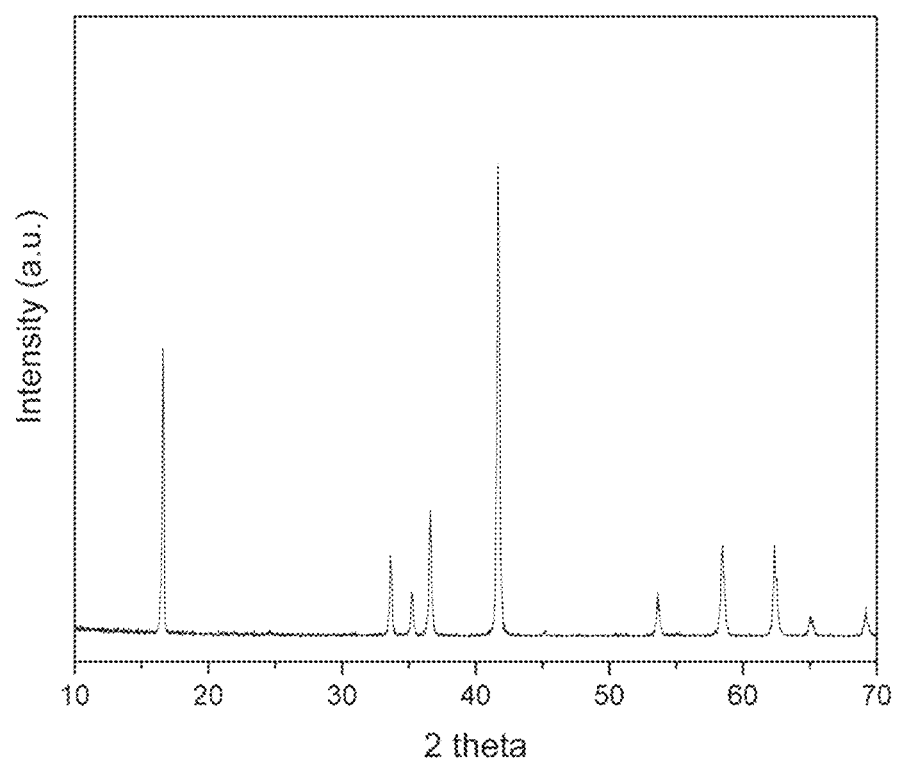
FIG. 6 shows the XRD pattern of bare NaCrO$_2$.
Figure 7:
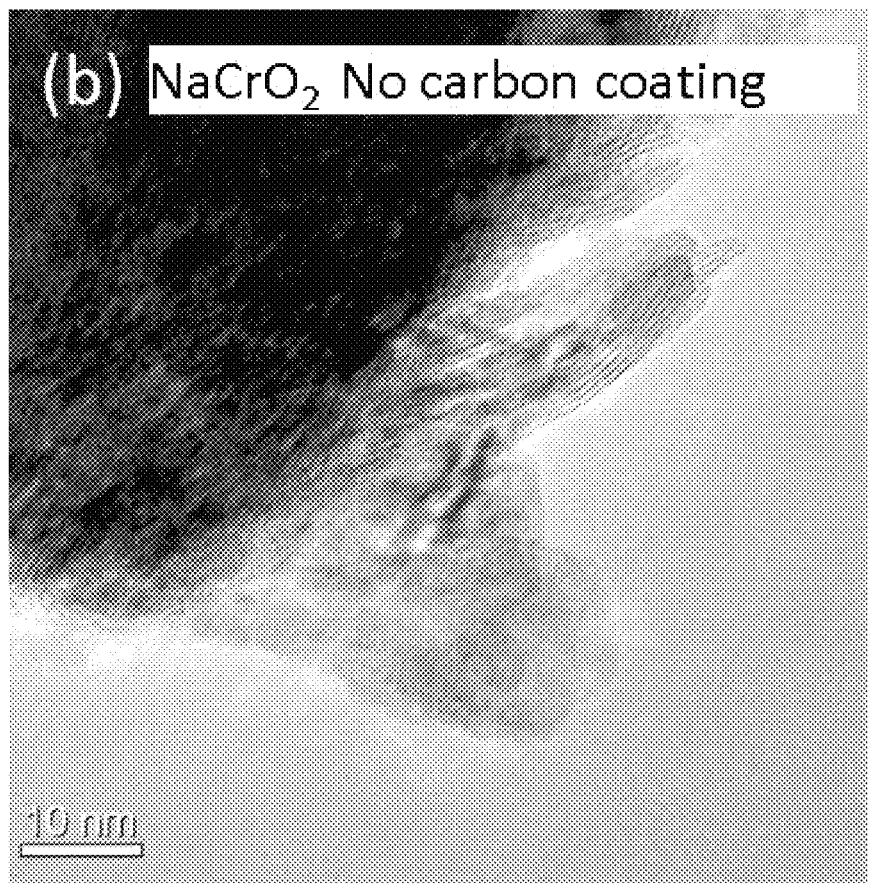
FIG. 7 shows the TEM image of bare NaCrO$_2$.
Figure 8:
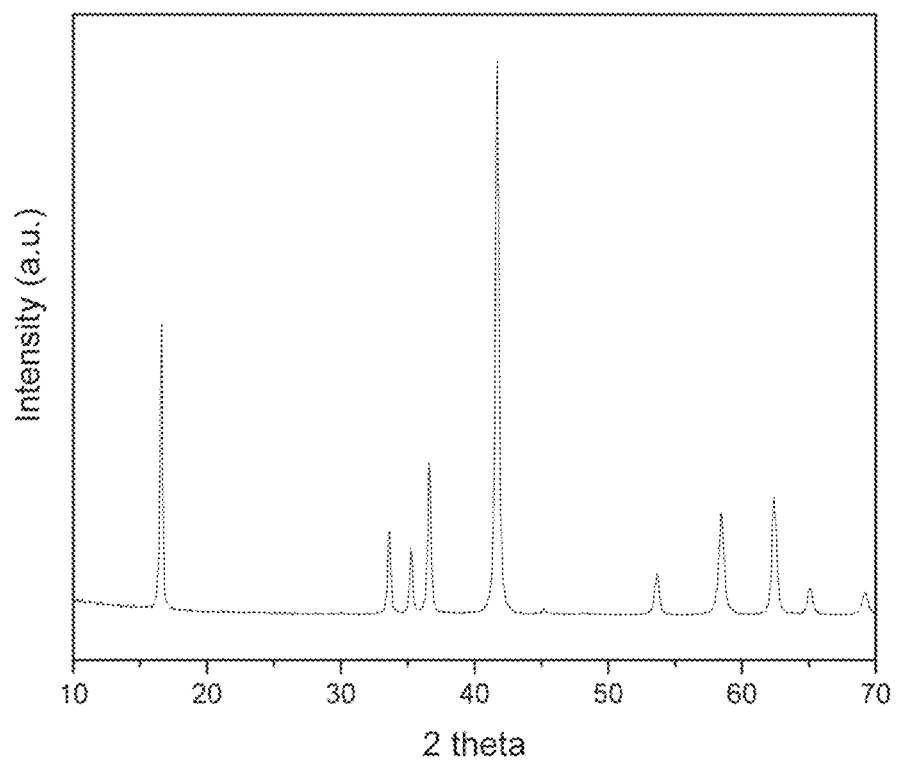
FIG. 8 shows the XRD pattern of carbon coated NaCrO$_2$.
Figure 9:
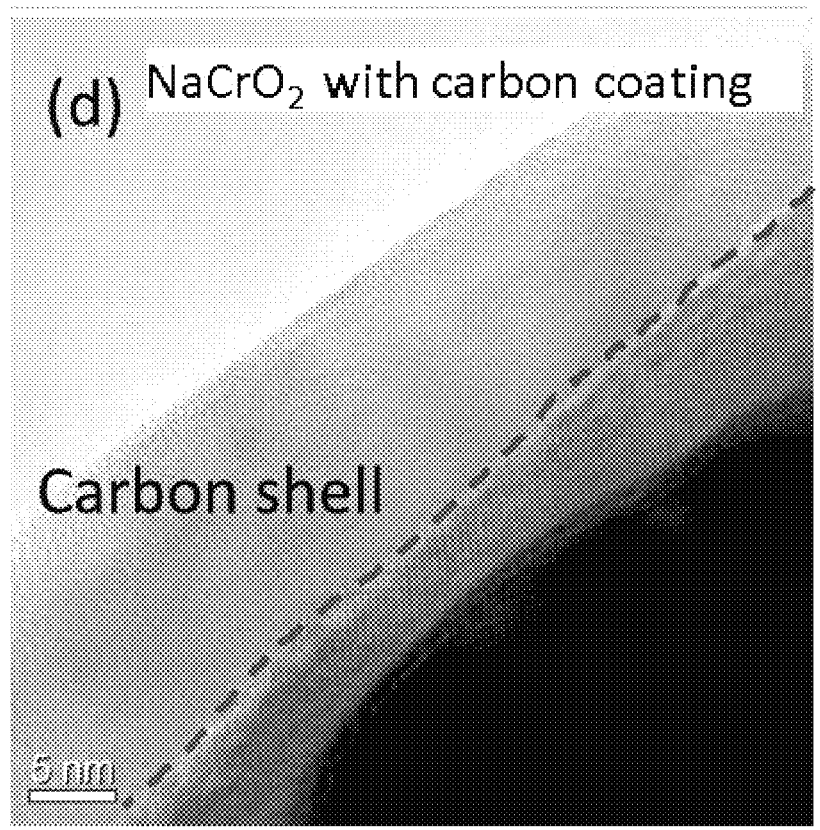
FIG. 9 shows the TEM image of carbon coated NaCrO$_2$.

In consideration that pure NaCrO$_2$ is known to react with CO$_2$ in air and form an insulative Na$_2$CO$_3$ thin film on the NaCrO$_2$ particle surface, which increases the resistance of the active material and subsequently prevent the high rate performance of the cathode material, the inventors sought a method to protect the NaCrO$_2$ particle surface. In this effort it was discovered that carbon coating may be an effective protective countermeasure. FIGS. 6 and 7 show the XRD and TEM of bare NaCrO$_2$ and FIGS. 8 and 9 show the XRD and TEM images of 5 wt % carbon coated NaCrO$_2$ materials. It should be noted that 5 wt % was estimated by the assuming all the carbon coming from the decomposition of C$_6$H$_{12}$O$_6$ without any loss during the synthesis (see Example 5). The actual carbon content may be measured by elemental CHN analysis. As shown in FIGS. 6 and 8, the observed XRD patterns are both identical to each other and can be indexed to a rhombohedral R3m space group. There is no identified carbon peak in FIG. 8, suggesting the carbon in the product is present as an amorphous phase. The TEM image of the bare NaCrO$_2$ exhibits plate-like particles with smoothly developed edges. On the other hand, the TEM image of the carbon coated sample clearly shows the presence of a foreign layer, carbon, on the surface of NaCrO$_2$ (FIG. 9). The carbon layer has a thickness about 10 nm. The amount and thickness of the carbon layer may be controlled by change of the amount of carbon source. The inventors believe the thickness of the carbon coating may be from 5 mm to 30 mm, preferably 8 to 20 mm.

Figure 10:
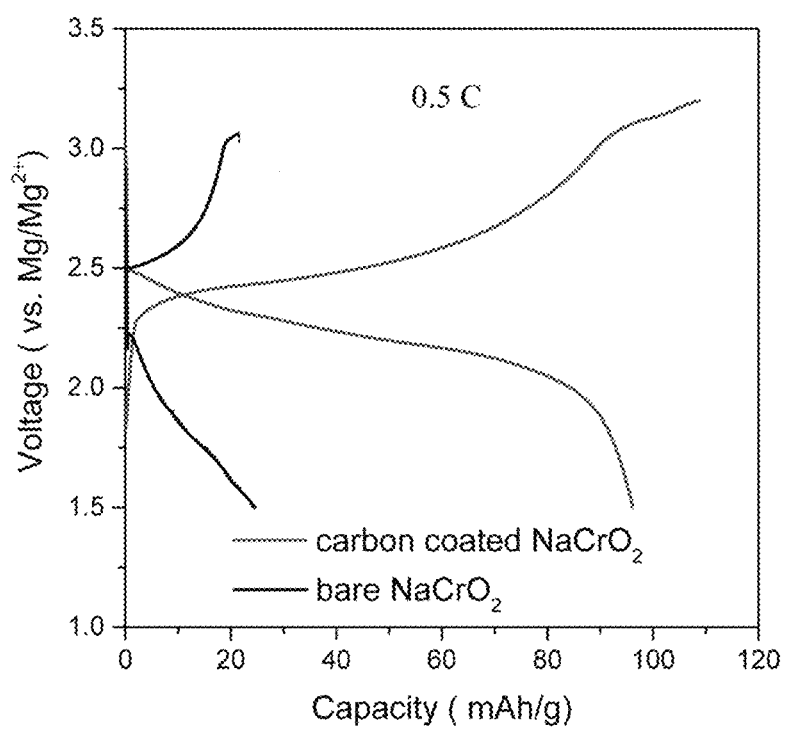
FIG. 10 shows voltage profiles of bare and carbon coated NaCrO$_2$ cycling at a rate of 0.5 C.
Figure 11:
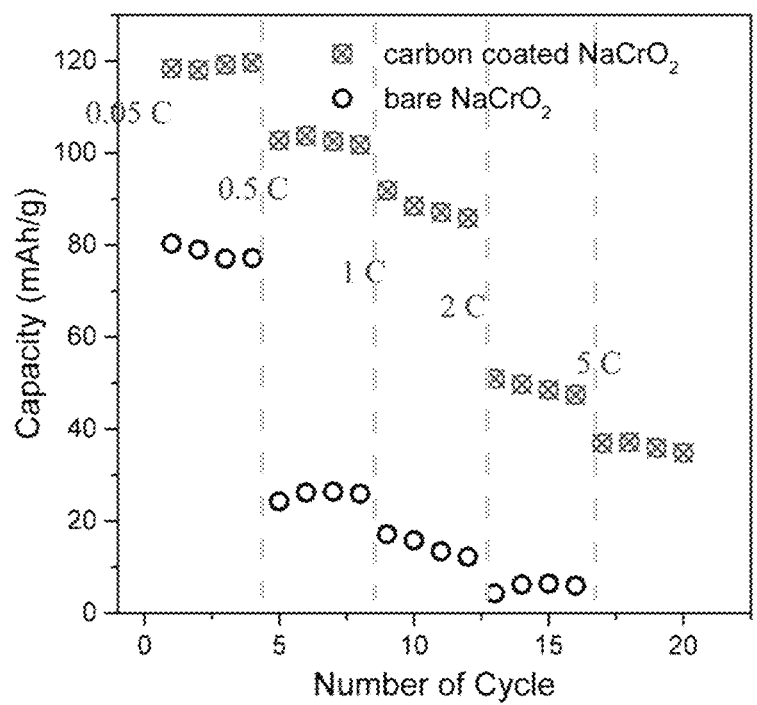
FIG. 11 shows the rate performance of the bare and carbon coated NaCrO$_2$ electrodes at various rates.

The electrochemical performances of bare and carbon coated NaCrO$_2$ were measured at different rate in the dual ion system in the voltage range from 1.5 V to 3.2 V vs. Mg/Mg$^{2+}$ with the optimized electrolyte of APC and NaCB at the ratio of 3/7. FIG. 10 shows a typical voltage profile of NaCrO$_2$ cycling at a rate of 0.5 C. The bare and carbon coated NaCrO$_2$ delivered the capacities of 100 and 25 mAh/g, respectively, on discharge. It also should be noted that the voltage hysteresis of carbon coated electrode is much lower than that of the bare sample. The improvement of the voltage profile and capacity may be obtained by carbon coating on the NaCrO$_2$ particles. It has been reported that the presence of carbon coating dramatically increased the electrical conductivity of NaCrO$_2$ (Energy. Environ. Sci., 2015, 8, 2019). FIG. 11 shows the rate performance of the two electrodes at various rates. Severe capacity fading was observed for bare NaCrO$_2$. On the contrary, carbon coated NaCrO$_2$ electrodes displayed much better performance, especially at 0.05 to 1 C rates. The superior rate capacity further evidenced that a carbon coating technique is a powerful method to improve the rate performance.

In a further specific aspect of the first embodiment a magnesium battery is provided, wherein the magnesium ion salt is PhMgCl—AlCl$_3$ (APC), the sodium ion salt is a sodium carborane of formula Na(CB$_{11}$H$_{12}$), and a content of the sodium carborane of formula Na(CB$_{11}$H$_{12}$) is from 50 to 90 mol %, preferably from 55 to 85 mol % and most preferably from 60 to 80 mol %.

Any suitable combination of dual magnesium ion-sodium ion electrolyte system may be employed as described in these embodiments. One of ordinary skill may optimize the performance of the electrolyte system using the methods described herein as well as standard test methods known in the art.

Thus, a rechargeable magnesium battery is provided which includes an anode of magnesium metal or a composition containing magnesium metal such that magnesium ions are released and redeposited on the anode during discharge and charge of the battery respectively.

The cathode may be constructed of any material capable of intercalation and release of sodium ions which is compatible with the nonaqueous solvent. Examples of such materials may include sodium salts such as $NaCrO_2$, $Na_2Ti_6O_{13}$, $NaVPO_4F$ and $NaFePO_4F$. In preferred embodiments the cathode may contain at least one of $NaCrO_2$ and $Na_2Ti_6O_{13}$.

In further preferred embodiments, the cathode active material may be coated with an amorphous carbon layer of from 5 to 30 mm in thickness. This embodiment is described in Example 5.

The cathode active material may be present as a sheet, ribbon, particles, or other physical form. An electrode containing the cathode active material may be supported by a current collector.

The cathode active material may further include an electrically conductive material and a binder. Examples of electrically conducting materials include carbon particles, such as carbon black. Example binders include various polymers, such as PVDF, PTFE, SBR, and polyimide.

The anode active material which is not pure magnesium metal may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions.

A current collector may include a metal or other electrically conducting sheet on which the electrode is supported. The current collector may be formed of carbon, carbon paper, carbon cloth or a metal or noble metal mesh or foil.

Figure 12:
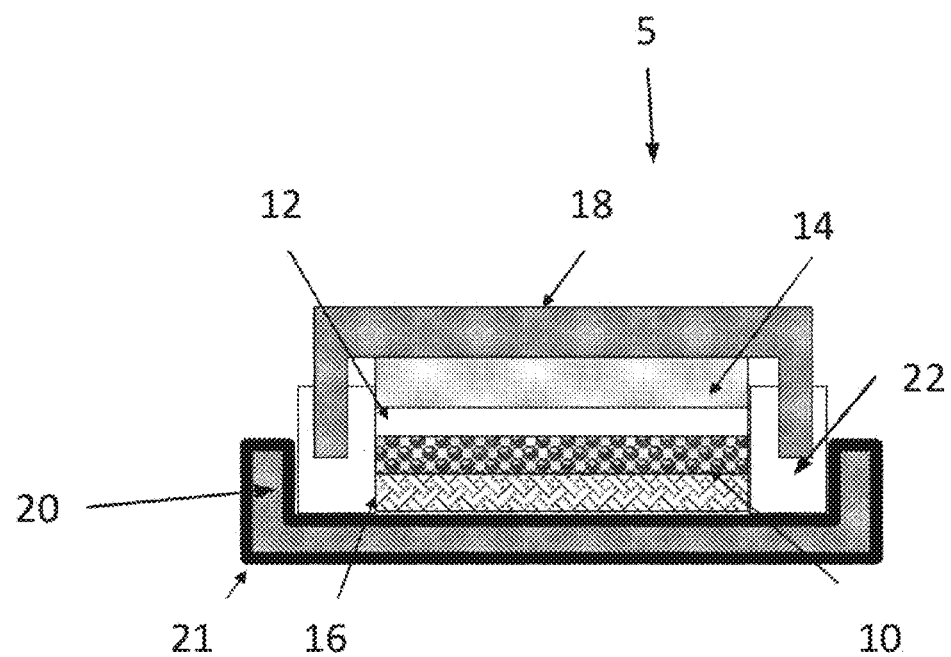
FIG. 12 shows a diagram of a magnesium battery according to one disclosed embodiment.

FIG. 12 shows an example of one configuration of a rechargeable magnesium battery 5. The battery 5 includes a positive electrode 10 comprising as a cathode active material, any of the materials disclosed above, preferably at least one of $NaCrO_2$ and $Na_2Ti_6O_{13}$, an electrolyte layer 12 containing the dual $Mg^{2+}$/Na+ electrolyte salts of the embodiments described above, a negative electrode 14 containing magnesium metal, preferably pure magnesium metal, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16.

The ether solvent may be one or more of tetrahydrofuran, ethylene glycol dimethyl ether and bis 2-methoxy ethyl ether in consideration of utility in a battery, safety and ease of handling. Tetrahydrofuran, tetraglyme or a combination thereof may be most preferred, although battery construction and requirements may dictate the necessity for an ether with different physical properties.

The disclosure further provides a vehicle having a rechargeable magnesium battery as disclosed herein. Such vehicle may include an automobile, a truck, a van, a golf cart and a sport vehicle or all-terrain vehicle. The rechargeable magnesium battery disclosed here may be the main source of energy for the vehicle or serve as an auxiliary source of power.

Having generally described this invention, a further understanding can be obtained by reference to certain specific examples which are provided herein for purposes of illustration only and are not intended to be limiting unless otherwise specified.

EXAMPLES

Example 1

A Mg—Na dual ion battery was constructed with a magnesium metal negative electrode and a positive electrode of $Na_2Ti_6O_{13}$. The electrolyte was prepared of 0.5 M $Na(CB_{11}H_{12})$ and 0.25 M $Mg(CB_{11}H_{12})_2$ dissolved in tetraglyme. The cell delivered 11 mAh/g capacity in the discharge and was charged to a capacity of 15 mAh/g.

Figure 2:
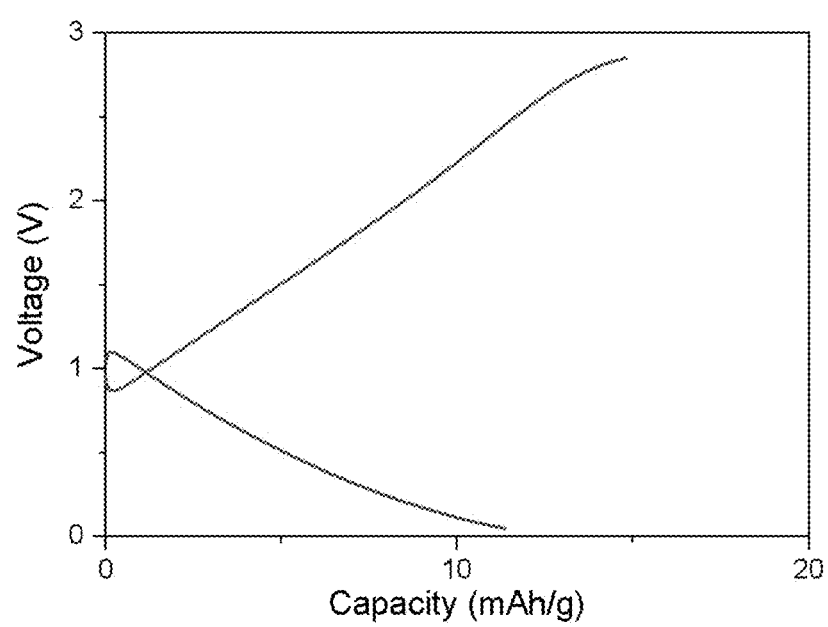
FIG. 2 shows a voltage profile of a Mg—Na dual ion battery according to one embodiment of the present invention as prepared in Example 1.

FIG. 2 shows a Voltage profile of the battery using a test current of 10 µA.

FIG. 3(A) shows the cyclic voltage profile of the Mg—Na dual ion battery and FIG. 3(B) shows the discharge capacity as a function of cycle number using a test current of 10 µA.

Example 2 (Comparative)

Figure 4:
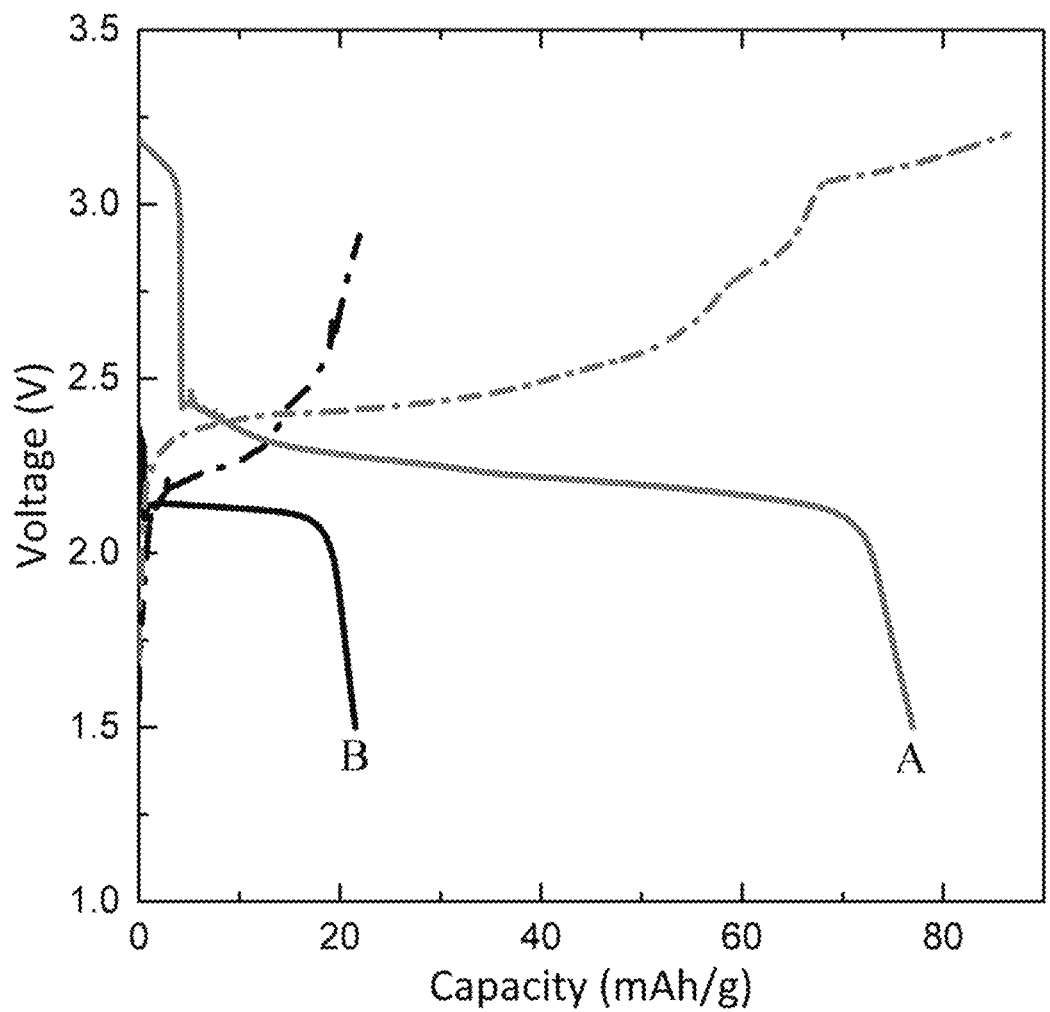
FIG. 4 shows the voltage profiles of the batteries prepared in comparative Example 2 and Example 3.

A battery was constructed with a magnesium metal negative electrode and a positive electrode of $NaCrO_2$. An electrolyte of 0.5 M $Na(CB_{11}H_{12})$/tetraglyme was used. FIG. 4 (curve B) shows the voltage profile of the battery and as indicated a discharge capacity of ~20 mAh/g was obtained.

Example 3

A battery was constructed with a magnesium metal negative electrode and a positive electrode of $NaCrO_2$. An electrolyte of 0.5 M $Na(CB_{11}H_{12})$/tetraglyme and 0.4 M $PhMgCl—AlCl_3/THF$ was used. The cell delivered a discharge capacity about 80 mAh/g (FIG. 4 (curve A) was used. This capacity was much higher than the capacity of the battery in Comparative Example 2 and indicated that the addition of a $Mg^{2+}$ source to the electrolyte could significantly improve the battery performance.

Example 4

A battery was constructed with a magnesium metal negative electrode and a positive electrode of $NaCrO_2$. An electrolyte of 0.5 M $Na(CB_{11}H_{12})$/tetraglyme and 0.4 M PhMgCl—AlCl$_3$/THF was used. A study was then conducted to determine the effect of the relative amounts of the two electrolytes. The $2^{nd}$ discharge capacity of Mg—Na dual ion battery using different relative amounts of Na(CB$_{11}$H$_{12}$) and APC electrolyte was determined as shown in FIG. 5. At first, the capacity increased with mol % amount of APC added, because the existence of Mg$^{2+}$ source in the electrolyte improved both charge and discharge capacity. The reversible capacity reached a maximum of 83 mAh/g at an optimal APC ratio of 20-40 mol % and then decreased as more APC was added. It is believed that the decrease of the capacity with increasing APC beyond 40% is related to the reduction of Na$^+$ source in the electrolyte mixture.

Example 5

A cathode active material was prepared by mixing 3.35 g Na$_2$C$_2$O$_4$, 3.8 g Cr$_2$O$_3$ and 0.703 g C$_6$H$_{12}$O$_6$ (carbon source). The mixture was then ball milled in a ZrO$_2$ pot with 10 balls (Φ1 cm) at a 500 rpm for 1 h. The resultant mixture was heated at 400° C. for 2 h in Ar and then the product was pressed to a pellet which was calcined at 900° C. for 10 h in Ar flow.

FIGS. 6 and 7 shows the XRD and TEM of the bare NaCrO$_2$ material and FIGS. 8 and 9 show the XRD and TEM of the 5 wt % carbon coated NaCrO$_2$ material. It should be noted that 5 wt % was estimated by the assuming all the carbon coming from the decomposition of C$_6$H$_{12}$O$_6$ without any loss during the synthesis. As shown in FIGS. 6 and 8, the observed XRD patterns were both identical to each other and can be indexed to a rhombohedral R3m space group. There was no identified carbon peak in FIG. 8, suggesting the carbon in the product is present as an amorphous phase. The TEM image of the bare NaCrO$_2$ exhibited plate-like particles with smoothly developed edges. On the other hand, the TEM image of the carbon coated sample clearly showed the presence of a foreign layer, carbon, on the surface of NaCrO$_2$ (FIG. 9). The carbon layer has a thickness about 10 nm.

The electrochemical performances of bare and carbon coated NaCrO$_2$ were measured at different rate in the dual ion system in the voltage range from 1.5 V to 3.2 V vs. Mg/Mg$^{2+}$ with the optimized electrolyte of APC and NaCB at the ratio of 3/7. FIG. 10 shows a typical voltage profile of NaCrO$_2$ cycling at a rate of 0.5 C. The bare and carbon coated NaCrO$_2$ delivered the capacities of 25 and 100 mAh/g, respectively, on discharge. It also should be noted that the voltage hysteresis of carbon coated electrode is much lower than that of the bared sample. The improvement of the voltage profile and capacity mostly is related to the carbon coating on the NaCrO$_2$ particles. FIG. 11 shows the rate performance of the two electrodes at various rates. The battery was tested at different C rate (higher C rate means higher current). As indicated in FIG. 11, the battery was tested at each C rate for 5 cycles and then moved to another C rate. Severe capacity fading was observed for bare NaCrO$_2$. On the contrary, carbon coated NaCrO$_2$ electrodes displayed much better performance, especially at 0.05 to 1 C rates. The superior rate capacity further evidenced that a carbon coating technique is a powerful method to improve the rate performance of the hybrid electrolyte cell.

Example 6

A Tom cell was constructed as follows. A cathode was prepared by mixing 70 wt % active material prepared in Example 5, 10 wt % PTFE and 20 wt % of conductive carbon and pressed to a 120 um sheet. An anode of Mg metal where the surface was cleaned was used and a glassy fiber filter paper was included as a separator. A Mg—Na hybrid electrolyte was prepared by mixing 0.4 M all-phenyl-complex (PhMgCl—AlCl$_3$ in THF, APC) electrolyte and 0.5 M Na—(CH$_{11}$B$_{12}$)/tetraglyme (NaCB) electrolyte at different volume ratios. 0.25 ml fresh Mg—Na electrolyte was added in each cell.

The electrochemical performance of each Tom cell as a function of electrolyte ratio was tested.

The invention claimed is:

1. A magnesium-ion battery, comprising:
    an anode comprising magnesium metal;
    a cathode, capable of absorption and release of Na ions; and
    a nonaqueous electrolyte comprising:
        a sodium ion salt which is a sodium carborane of formula Na(CB$_{11}$H$_{12}$);
        a magnesium ion salt selected from the group consisting of PhMgCl—AlCl$_3$ (APC), a Mg carborane, and magnesium hexamethyl disalazide chloride (MgHMDS—Cl); and
        a nonaqueous solvent.

2. The magnesium-ion battery of claim 1, wherein a mol % content of the sodium ion salt in the nonaqueous electrolyte is at least 60 mol % of the total amount of the sodium ion salt and magnesium ion salt.

3. The magnesium-ion battery of claim 1, wherein the nonaqueous solvent comprises at least one solvent selected from tetrahydrofuran (THF), glyme, diglyme and tetraglyme.

4. The magnesium-ion battery of claim 1, wherein
    the magnesium ion salt is PhMgCl—AlCl$_3$ (APC),
    a content of the sodium carborane of formula Na(CB$_{11}$H$_{12}$) is from 50 to 90 mol % of the total amount of APC and Na(CB$_{11}$H$_{12}$).

5. The magnesium-ion battery of claim 4, wherein the nonaqueous solvent comprises THF and tetraglyme.

6. The magnesium-ion battery of claim 1, wherein the cathode comprises at least one of NaCrO$_2$ and Na$_2$Ti$_6$O$_{13}$.

7. The magnesium-ion battery of claim 6, wherein the cathode comprises NaCrO$_2$ and the NaCrO$_2$ is coated with an amorphous carbon layer.

8. The magnesium-ion battery of claim 6, Wherein the cathode comprises Na$_2$Ti$_6$O$_{13}$ and the Na$_2$Ti$_6$O$_{13}$ is coated with an amorphous carbon layer.

9. A vehicle comprising the battery of claim 1.

10. A vehicle comprising the battery of claim 7.

* * * * *